United States Patent [19]
Bencini et al.

[11] Patent Number: 5,181,785
[45] Date of Patent: Jan. 26, 1993

[54] SLEEVE BEARING

[75] Inventors: Durval Bencini; Mario S. Da Silva Praca, both of Sao Paulo - SP, Brazil

[73] Assignee: Metal Leve S.A. Industria E Comercio, Sao Paulo, Brazil

[21] Appl. No.: 777,899

[22] Filed: Oct. 17, 1991

Related U.S. Application Data

[63] Continuation-in-part of Ser. No. 514,003, Apr. 25, 1990, abandoned.

[30] Foreign Application Priority Data

Apr. 26, 1989 [BR] Brazil .............................. PI 8902442

[51] Int. Cl.$^5$ .............................................. F16C 17/02
[52] U.S. Cl. ................................................... 384/288
[58] Field of Search ............... 384/288, 294, 273, 287, 384/291

[56] References Cited

U.S. PATENT DOCUMENTS

| | | | |
|---|---|---|---|
| 3,625,580 | 12/1971 | DeHart et al. | 384/288 |
| 4,311,349 | 1/1982 | Roberts | 384/288 |
| 4,668,107 | 5/1987 | Showalter | 384/288 |

*Primary Examiner*—Lenard A. Footland
*Attorney, Agent, or Firm*—Darby & Darby

[57] ABSTRACT

A bearing halfshell for internal combustion engine connecting rods with its inner surface having a substantially constant radius of curvature from a central plane of symmetry to two portions of the inner surface located one on each side of the central plane of symmetry and on a corresponding radial plane. The radial plane forms an acute angle $\alpha$ with a bearing parting plane, the remaining end portions of the inner surface from the radial plane to the end of the bearing being defined by surfaces with extra relief so that the bearing thickness gradually decreases away from the central plane of symmetry in an accentuated manner as compared to the constant radius of curvature of the inner surface. Thereby, two chambers are formed in the end portions, with an eccentricity $\epsilon$, of the inner surface ensuring a stable film of oil between the bearing halfshell and a corresponding shaft, and reducing the operating temperature of the bearing halfshell. An elliptic contour for the eccentric surface provides good performance.

10 Claims, 1 Drawing Sheet

5,181,785

SLEEVE BEARING

This application is a continuation-in-part of Ser. No. 514,003 filed Apr. 25, 1990, for Sleeve Bearing, now abandoned.

BACKGROUND OF THE INVENTION

This invention relates to a sleeve bearing intended for use in four-stroke internal combustion engines, particularly as a connecting rod bearing.

As known by those skilled in the art, a clearance is provided for holding a film of lubricating oil between the inner peripheral surface of the bearing and the crankpin. According to the current technology concepts, an adequate choice of the assembly clearance between the shaft and the bearing is made based on load and lubrication considerations, generally with the aid of computerized methods. In such studies, minimum and maximum amounts for these clearances are defined by key parameters such as the bearing operating temperature, minimum oil film thickness and maximum oil film pressure.

Where the bearing-to-shaft clearance is reduced, the oil film is subjected to a high shearing stress causing the sleeve bearings to overheat, besides facilitating a contact between the shaft and the bearing due to an excessively thin oil film. Under such conditions, the bearing material is subject to failure by overheating and excessive wear. On the other hand, large clearances cause an excessive hydrodynamic pressure in conjunction with a reduction in the oil film thickness, thereby exposing the bearing material to fatigue failure and excessive wear. The numerical techniques currently employed afford a prediction of acceptable limits for assembly clearances based on lubricating oil characteristics and the bearing geometry and materials.

The high-load four-stroke internal combustion engines, designed according to current trends, have subjected bearings, particularly the connecting rod bearings, to an excessive load and wear, which become prohibitive and eventually cause fatigue and overheating problems. These engines, in which high operating speeds are combined with a low mass interest of every component, subject the connecting rods to high inertia loads thereby causing distortions on their big end hole during operation. Due to the connecting rod configuration and the manner by which they transmit forces, the resulting distortions are such that during the exhaust stroke and, to a lesser degree, during the compression stroke, the rod larger end tends to have its diameter increased along the centerline of the big end and small end holes, and reduced in a direction orthogonal to the centerline. On the other hand, during the expansion stroke the big hole tends to have its diameter increased, or even unchanged, in a direction orthogonal to the connecting rod big end and small end centerline.

The amounts of these diametral variations are dependent on the inertia loads acting on the connecting rods as well as the structural resistance of the rods, which are related to both the quantity and distribution of mass in its design. The reduction in clearance in the direction of closing of the connecting rod hole causes disturbances in the creation of a stable lubricating oil film and a consequential increase of the operating temperature. Under such conditions, a bearing-to-journal contact may take place close to the point below the parting plane with a subsequent failure of the bearing material caused by excessive wear and overheating.

Because of the instability or turbulence developed in the oil film, this closing can further lead the bearing sliding surface to erosion damages caused by cavitation in the oil film. In the aforesaid circumstances of closing the hole under inertia load, one must increase the clearance in the direction of closing thereby enabling a stable lubricating oil film, thus preventing heat from being generated above levels determined beforehand. This measure, an increase of the diametral clearance by the use of a pair of conventional halfshells, although solving problems arising out of the closing of the rod big end hole subjected to inertia loads, can on the other hand give rise to problems on the bearing placed in the rod half during the expansion stroke. An excessive increase in the operating clearance may create a highly detrimental increase in the hydrodynamic pressure developed on the lubricating oil film, in conjunction with an equally detrimental decrease in the minimum oil film thickness. These two conditions may lead to an excessive wear or fatigue failure of the bearing material.

BRIEF DESCRIPTION OF THE INVENTION

With a view to overcoming the disadvantages resulting from the use of conventional bearings for applications where lubrication problems arising out of the said deformation are present, the present invention contemplates the use of connecting rod bearing halfshells having geometric features intended to provide the halfshells with better lubrication conditions, thereby imparting a higher resistance to fatigue and wear.

It is, therefore, the main object of the present invention to provide a connecting rod bearing whose relief portions exhibit a reduced thickness as compared with the thickness of the control portion of the bearing, thereby defining an eccentricity.

DESCRIPTION OF THE PREFERRED EMBODIMENTS

Figure 1:
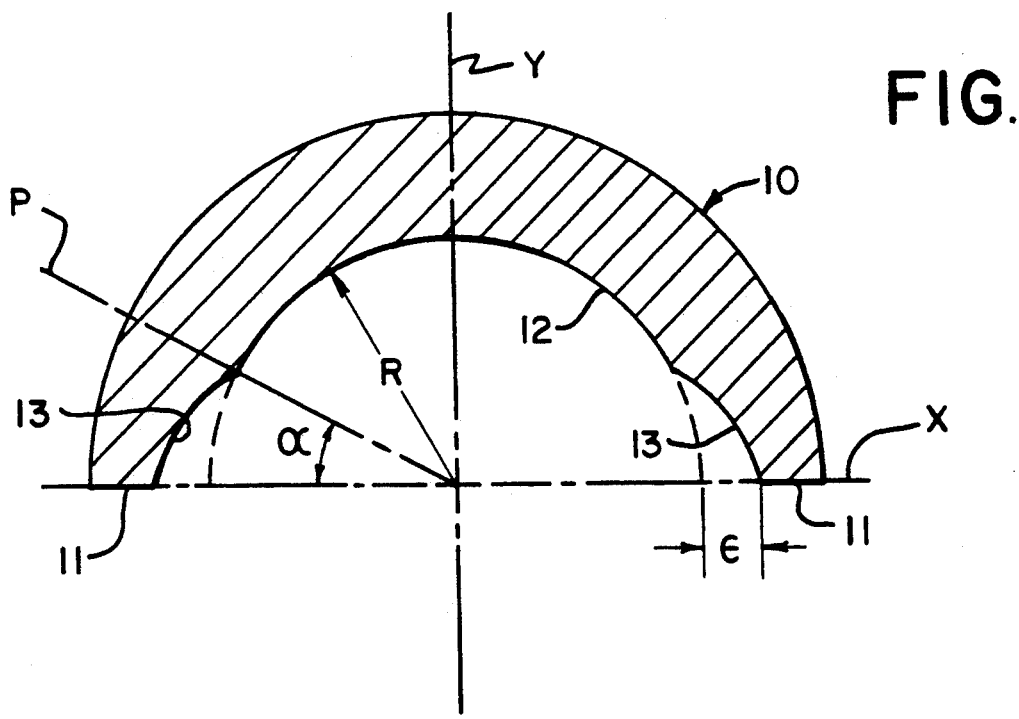
FIG. 1 is a view in cross section of a bearing halfshell in accordance with the invention.

As depicted in the drawing (FIG. 1), the bearing halfshell 10 in accordance with the invention has a central plane of symmetry Y, a pair of diametrally opposed ends 11 located on a parting plane X, and an inner sliding surface 12. The inner sliding surface 12 of the halfshell has a substantially constant radius R. The surface 12 extends from the central plane of symmetry Y up to two portions or regions, located one on each side of the central plane of symmetry Y and beginning on a respective radial plane P, which defines, with the bearing parting plane X, an acute angle α, preferably from about 5 degrees to 45 degrees.

From each of said regions starting with the plane P and extending to the respective end 11 of the halfshell 10, the inner bearing surface is defined by a surface 13 which gradually recedes in a direction away from the central plane of symmetry Y in a more accentuated manner than does a surface that could be obtained (broken lines) with the radius R of the inner surface 12, in order to provide an eccentricity ε in the respective end portions of the inner surface, the amount of the eccentricity ε varying from 0.01 mm to 0.25 mm. That is, the radius of curvature increases gradually in the surface region 13 from plane P to the end 11 of the bearing. This takes place on each side of the halfshell. Thus, the radial thickness of the halfshell 10 decreases in the areas 13.

In addition to providing relief of the hydrodynamic pressures developed on the portion subjected to the highest loads on the oil film between the bearing and the shaft, the relief portion 13, with a reduced bearing thickness, functions as an oil pocket which ensures a stable oil film, free of any turbulence or any other factor of distress. This in turn allows the bearing to operate at lower temperatures, which increases the lubricating oil viscosity and in consequence the minimum oil film thickness without increasing the peak oil film pressure.

On the other hand, a number of known bearing halfshells have their central portion provided with a hole for the passage of oil intended to lubricate the cylinder liner and the piston pin and/or cool the piston. For this reason, a substantial amount of lubricating oil is deviated from that portion of the bearing subjected to the higher loads, thereby causing a shortage of oil, which can lead to excessive wear, fatigue and an early failure of the bearing.

This problem is also solved by the oil pocket created by the bearing design in accordance with the invention, in that the relieved portion is always provided with an oil film having a thickness required for proper operation of the bearing.

One additional advantage provided by the bearing halfshell in accordance with the present invention lies in the fact that the halfshell can be installed on connecting rods where the location of the halfshell in the bearing cap is not precise, without jeopardizing its lubricating condition.

An embodiment of a bearing halfshell in accordance with the invention that has given satisfactory results in performance is now described with reference to FIG. 2. Reference numerals for corresponding elements are the same as in FIG. 1 except for the addition of a "prime" marking to distinguish from the more generic configuration of FIG. 1.

Figure 2:
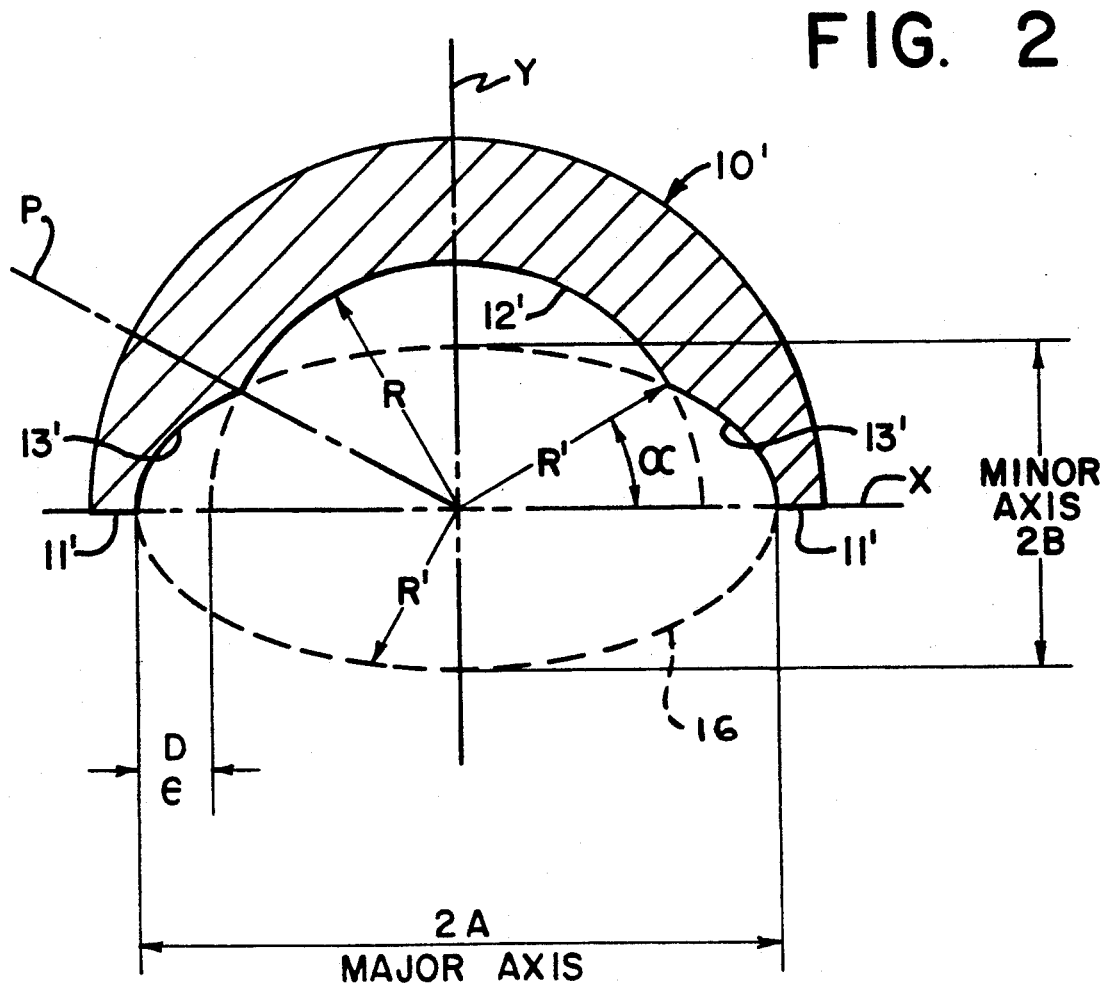
FIG. 2 is a view similar to FIG. 1 showing a half-shell bearing having an elliptical eccentricity in accordance with the invention.

In FIG. 2, the concentric portion 12' of the bearing surface has its center (origin) at the intersection of the central plane Y with the parting plane X. The eccentric portions 13' are elliptical, that is, they are portions of the ellipse 16, the remainder of which is illustrated in FIG. 2 with a broken line. The ellipse 16 has its major axis 2A lying on the parting plane X and its minor axis 2B lying on the central plane Y.

The distance from the origin of the concentric portion 12', also the intersection of the major and minor axes, to the outline of the ellipse 16 is constantly changing as the angle of rotation about the origin changes. At the radial plane P, the radius R of the concentric portion 12' of the bearing surface is equal to the distance R' from the origin to the bearing surface of the eccentric portion 13'.

The mathematical relationships for a bearing halfshell as illustrated in FIG. 2, with an elliptical eccentric portion, are as follows:

$$\left(\frac{X}{A}\right)^2 + \left(\frac{Y}{B}\right)^2 = 1 \quad \text{(Equation of Ellipse)} \quad (1)$$

where
A = major semi-axis
B = minor semi-axis
at angle α:

$$X = R^1 \cos \alpha \quad (2)$$

$$Y = R^1 \sin \alpha \quad (3)$$

$$R = R^1 \quad (4)$$

$$R = A - R = \epsilon \quad (5)$$

When parameters have been selected, e.g. concentric radius R, angle α, eccentricity ε, the coordinates of the elliptic surface 13[1] may be determined mathematically.

The distances R[1] from the origin to the elliptical surface increase more rapidly as the major axis X, the parting line, is approached, as compared to a circular surface. This provides a better cooling condition for the bearing, which in turn allows a higher operating speed for the engine, because the oil film thickness is substantially increased in the elliptical region as compared to the circular arc surface used in the prior art.

Furthermore, this advantage of improved cooling is achieved without detriment to load bearing capacity. For example, in the prior art increase in the oil film thickness is attained by increasing the angle α of the eccentric portion in a circumferential direction along the inner bearing surface, at the expense of the concentric portion. To the contrary, with the elliptical contours as described, an increase in space between the bearing surface and the shaft is provided in a radial direction, as indicated in FIG. 2 by the letter D which corresponds to eccentricity ε.

As the distance from the origin to the elliptical surface increases as it approaches the parting line X, the radius of curvature of the surface is increasing. In comparison with the prior art, for equal ε, and if equal angles of eccentricity α are taken from the parting line X, a larger lubricating oil reservoir volume is attained when the eccentric portion is elliptical as compared to an eccentric portion which has a circular arc, as is common in the prior art.

As indicated, this larger lubricating oil reservoir allows the bearing to withstand higher loads because lower angles α are sufficient to form the oil reservoir then required. Consequently, a greater concentric portion can be defined for the bearing. The concentric portion is that portion that bears a load applied by a shaft. Thus, with the elliptical eccentric portion, a range of α having a maximum value of only 45 degrees is possible, where prior art bearings with constant radius eccentricities required a maximum value of 60 degrees for α for the same operating conditions.

Present high performance internal combustion engine shafts apply loads to the sliding bearing at such a level that a minimum 90 degrees concentric portion is required to support the shaft. Circular eccentric portions, as used in many prior art devices, are not able to operate for extended periods under these severe conditions because they have maximum values of α extending to 60 degrees or more, which means that only approximately 60 degrees or less of the bearing surface is reserved for the concentric portion.

In summary, the radius of curvature of the eccentric surface is related to the oil reservoir that can be provided with a given angle α. The angle α determines how much concentric portion remains for actual load bearing. Therefore, the two factors are interrelated and the increased oil reservoir provided by the elliptical eccentric portion, other factors being equal, favorably affects performance of the bearings and their load carrying capability. Use of the elliptical surface increases the potential for enlarging the concentric portion of the bearing, that is improving load capacity, while at the same time maintaining an adequate oil reservoir for lubrication and cooling.

While the invention has been particularly shown and described with reference to a preferred embodiment thereof, it will be understood by those skilled in the art that various changes in form and details may be made therein without departing from the spirit and scope of the invention.

WHAT IS CLAIMED IS;

1. A bearing halfshell for use with internal combustion engine connecting rods, said halfshell having a central plane of symmetry, a pair of diametrally opposed ends located on a bearing parting plane and an inner sliding surface of substantially constant radius centered on said parting plane, said constant radius surface extending in opposite directions from the central plane of symmetry to two end regions of said inner surface located one on each side of the central plane of symmetry, each said end region beginning at a respective radial plane which defines an angle with the bearing parting plane, the bearing inner surface being defined between each one of said radial planes and the end located on the same side of the central plane of symmetry, by a non-circular curved surface portion having a radius of curvature gradually increasing as said non-circular surface portion extends in the direction away from the central plane of symmetry to thereby produce an eccentricity $\epsilon$ on the respective end regions of the inner surface.

2. The bearing halfshell of claim 1, wherein each radial plane defines with the bearing parting plane an angle in a range from approximately 5 degrees to 45 degrees.

3. The bearing halfshell of claim 2, wherein the eccentricities $\epsilon$ range from about 0.01 mm to about 0.25 mm.

4. The bearing halfshell of claim 2, wherein said non-circular curved surface is a portion of an ellipse said ellipse having a major axis coincident with said bearing parting plane and a minor axis coincident with said central plane of symmetry, said elliptical surface intersecting said surface of substantially constant radius at said parting planes.

5. A bearing halfshell as in claim 1, wherein said non-circular curved surface is a portion of an ellipse, said ellipse having a major axis coincident with said bearing parting plane and a minor axis coincident with said central plane of symmetry, said elliptical surface intersecting said surface of substantially constant radius at said parting planes.

6. The bearing halfshell of claim 1, wherein the eccentricities $\epsilon$ range from about 0.01 mm to about 0.25 mm.

7. A bearing halfshell for use with internal combustion engine connecting rods, said halfshell having a central plane of symmetry, a pair of diametrally opposed ends located on a bearing parting plane and an inner sliding surface of substantially constant radius centered on said parting plane, said constant radius surface extending in opposite directions from the central plane of symmetry to two end regions of said inner surface located one on each side of the central plane of symmetry, each said end region beginning at a respective radial plane which defines an angle with the bearing parting plane, the bearing inner surface between each one of said radial planes and the end located on the same side of the central plane of symmetry, being defined by a curved surface which is a portion of an ellipse, said ellipse having a major axis coincident with said bearing parting plane and a minor axis coincident with said central plane of symmetry, said elliptical surface intersecting said surface of substantially constant radius at said parting planes to thereby produce an eccentricity $\epsilon$ on the respective end regions of the inner surface.

8. The bearing halfshell of claim 7, wherein each radial plane defines with the bearing parting plane an angle in a range from approximately 5 degrees to 45 degrees.

9. The bearing halfshell of claim 8, wherein the eccentricities $\epsilon$ range from about 0.01 mm to about 0.25 mm.

10. The bearing halfshell of claim 7, wherein the eccentricities $\epsilon$ range from about 0.01 mm to about 0.25 mm.

* * * * *